3,330,620
METHOD FOR OXIDIZING AMMONIUM SULFITE TO AMMONIUM SULFATE
Angel Vian-Ortuno and Vicente Martin-Municio, Madrid, Spain, assignors to Empresa Auxiliar de la Industria, S.A., Madrid, Spain
No Drawing. Filed Apr. 22, 1963, Ser. No. 274,806
Claims priority, application Spain, Apr. 23, 1962, 276,718
15 Claims. (Cl. 23—119)

The present invention relates to a process for the quantitative oxidation of ammonium sulfite and, more particularly, for the oxidation of ammonium sulfite which has been formed by absorption of sulfur dioxide in aqueous ammonia solutions. Thus, the present invention is also concerned with the recovery of sulfur dioxide from waste gases in the form of ammonium sulfate.

The recovery and utilization of small concentrations of sulfur dioxide which are contained in waste gases discharged, for instance, from sulfuric acid plants, thermal power stations, certain types of metallurgic foundries and the like poses an important problem. It is desired not only to prevent contamination of the surrounding atmosphere such as would happen by allowing sulfur dioxide-containing gases to escape, but also to recover the sulfur dioxide—even though present only in great dilution—and to convert the same into valuable products.

It is well known to selectively absorb the sulfur dioxide of such waste gases in aqueous dispersions and solutions of lime and in aqueous ammonia solutions. However, the further treatment of the thus-formed sulfites is connected with considerable difficulties.

If a solution of ammonia in water or in a saline solution is used as absorbent for the sulfur dioxide, it has been proposed to subject the thus-formed sulfur dioxide-containing solution to contact with oxygen, for instance, with the oxygen of the air, so as to transform the ammonium sulfite of the solution into ammonium sulfate which then may be recovered as a crystallized product. However, in industrial practice, this direct oxidation poses great difficulties inasmuch as due to the gradual change in the pH of the solution the yield of the oxidizing reaction diminishes gradually and eventually reaches zero. It has been attempted to overcome this difficulty by adding catalysts such as certain cobalt, copper and iron salts as well as by trying to control the pH, however, nevertheless, after some time the oxidation practically comes to a standstill.

It is, therefore, an object of the present invention to overcome the above discussed difficulties in the recovery of sulfur dioxide in the form of ammonium sulfate.

It is a further object of the present invention to provide a method by which ammonium sulfite contained in an aqueous solution can be substantially completely converted into ammonium sulfate in a simple and economical manner.

Other objects and advantages of the present invention will become apparent from a further reading of the description and of the appended claims.

With the above and other objects in view, the present invention comprises in a method of oxidizing ammonium sulfite to ammonium sulfate, the step of contacting with an oxygen-containing gas an aqueous ammonium sulfite-containing solution having dispersed therethrough an organic, nitrogen-containing base so as to oxidize the ammonium sulfite of the solution to ammonium sulfate thereby forming an aqueous ammonium sulfate-containing solution which is substantially free of ammonium sulfite.

According to a preferred embodiment of the present invention, a nitrogen-containing organic base which is weaker than ammonium and which is insoluble in the aqueous solution is used and this base is selected from the group consisting of pyridine, picolines, lutidines, collidines, quinoline, pyridic coal-tar bases, pyridic bases derived from petro-chemical processes, bases containing pyridinic condensed rings and derivatives thereof.

The method of the present invention of converting ammonium sulfite into ammonium sulfate may also be carried out by forming a dispersion of an organic, nitrogen-containing base in an aqueous solution of ammonium sulfate and ammonium sulfite, the organic base being insoluble in the aqueous solution and being present in an amount equal to between 10% and 80% of the volume of the dispersion, passing air through the dispersion while the same is maintained at an elevated temperature of between 40 and 140° C. and at an absolute pressure of between 1 and 11 atmospheres so as to substantially completely oxidize the ammonium sulfite of the solution to ammonium sulfate, separating the base from the thus-formed substantial ammonium sulfite-free solution, and recovering ammonium sulfate from the solution.

Surprisingly, it has been found that the oxidation of sulfite to sulfate can be carried out with up to a substantially 100% yield by proceeding in accordance with the present invention, namely by oxidizing the aqueous solution of ammonium sulfite in the presence of a nitrogenous organic base, and preferably under the conditions described further below.

To proceed in this manner has the further advantage that the nitrogenous base which is insoluble or immiscible in the aqueous sulfite and/or sulfate solution will form a distinct separate layer when the mixture is allowed to stand and thus, upon completion of the oxidation, the nitrogenous base can be easily separated by decantation from the aqueous ammonium sulafte solution. The thus obtained ammonium sulfate solution which preferably will be a substantially saturated solution maintained at an elevated temperature, may then be cooled whereby the solubility of the ammonium sulfate will be reduced and a portion thereof will crystallize from the supersaturated solution formed by cooling. It is, of course, also possible to obtain crystallized ammonium sulfate by evaporation of the solution. The thus obtained solid product is suitable, without further processing, for use in and as fertilizer or the like. The working conditions under which the ammonium sulfate is recovered from the aqueous solution thereof are less critical than is the case in the separation and recovery of many other chemical compounds.

The organic base which facilitates the oxidation of the ammonium sulfite and which should be finely dispersed throughout the aqueous solution during oxidation of the same may be any nitrogenous base which is immiscible with the aqueous solution and which is weaker than ammonia so that it will not cause freeing of ammonia from the dissolved ammonium sulfite or sulfate.

Thus, heterocyclic aromatic, aliphatic, cycloparaffinic and cycloolefinic amines, the heavy pyridic bases of the type derived from coal-tar, xylidine, toluidines, quinoline, dimethylaniline, methylamine, ethanolamines, cyclohexylaniline, pyridine, lutidines, diphenylamine, picoline, collidine, methylethylpyridine and dipyridyl may be used as well as other compounds which are of pyridic character or contain condensed pyridic rings, as well as nitrogen-containing basic derivatives thereof.

Preferably, the solution containing the ammonium sulfite which is to be oxidized to ammonium sulfate will be a concentrated solution of ammonium sulfate which contains between about 10 and 15% of ammonium sulfite. When feasible it is desirable to control the absorption of sulfur dioxide from the waste gases or the like in such a manner that thereby a solution is formed which will be a concentrated solution of ammonium sulfate containing between 10 and 15% of ammonium sulfite and the thus-formed solution is then immediately subjected to oxidation in accordance with the present invention.

Oxidation of the dissolved ammonium sulfite is carried out according to the present invention by contacting the ammonium sulfite-containing solution in the presence of a nitrogenous base with gaseous oxygen which may be introduced in the form of air, or pure oxygen, or air which has been enriched with oxygen. The best results are obtained if the oxidation is carried out at a somewhat elevated temperature such as between 40 and 140° C. and preferably at a temperature between 70 and 90° C., and at an absolute pressure of between 1 and 11 atmospheres. It is preferred to operate within the above described temperature and pressure ranges, however, the invention is not to be considered limited thereto. Generally, somewhat higher pressures will be preferred in combination with somewhat lower temperatures, in other words, the temperature may be inverse to the utilized pressure.

The proportion of the organic base in the liquid mixture containing ammonium sulfite which is to be oxidized may vary within broad ranges and preferably will be maintained between 10 and 80% of the entire volume of the mixture. The most suitable proportion of the base which will give the best results in any given case can be easily ascertained and will depend on the specific nitrogenous base which is used, the degree of the dispersion of the same and other operating conditions.

The process of the present invention, i.e., the oxidation of the ammonium sulfite solution can be carried out in any kind of apparatus which will afford intimate contact between the liquid and the oxidizing gas and which will permit maintaining the nitrogenous base finely distributed throughout the liquid. Thus, packing towers, plate towers, turbo-stirrers, etc., can be used for this purpose.

The effectiveness of a given proportion of the base will be improved, or the proportion of the base which is required will be reduced by favoring the interphasic dispersion, for instance by stirring the reaction mixture during oxidation of the same by anyone of the available conventional methods.

After oxidation of the dissolved ammonium sulfite has been completed, the reaction mixture is allowed to stand until the immiscible nitrogenous base has formed a distinct and separate layer. Thereafter, the aqueous solution is separated from the nitrogenous base preferably by simple decantation.

The remaining aqueous solution of ammonium sulfate may then be crystallized, centrifuged and dried in a conventional manner. The organic base is recycled from the decantation tank to the reaction vessel in which the oxidation of the ammonium sulfite is carried out.

The following examples are given as illustrative only of the present invention without, however, limiting the invention to the specific details of the examples.

EXAMPLE I

To 100 kg. of an aqueous ammonium sulfate solution, saturated at 20° C., and containing 5.5 kg. of ammonium sulfite, are added 40 kg. of 2-methyl-5-ethylpyridine. The thus-formed mixture is heated up to 90° C. and 7.6 standard cubic meters of air are passed through under vigorous stirring. In this manner the entire sulfite content of the solution is oxidized to ammonium sulfate.

Thereafter, the 2-methyl-5-ethylpyridine phase and the aqueous phase are separated by decantation, the latter now consisting of a concentrated solution of ammonium sulfate containing only an insignificant amount of 2-methyl-5-ethylpyridine; the aqueous phase is cooled down to 20° C. and thereby 6.25 kg. of crystallized ammonium sulfate are obtained, and the original saturated ammonium sulfate solution is regenerated. This solution can be re-used in a subsequent oxidation cycle as described above.

EXAMPLE II

Through 100 kg. of an aqueous solution of ammonium sulfate, saturated at 20° C., is passed a gas stream which contains 1.18 kg. of gaseous ammonia, and simultaneously or successively another stream of gas consisting of or containing 2.22 kg. or $SO_2$. To the resulting solution are added 0.625 kg. of water and 60 kg. of the fraction of pyridic bases boiling between 140 and 170° C. The entire mixture is then introduced into a reactor, in the interior of which exists an oxygen atmosphere, heated therein to 80° C. and vigorously stirred. The oxygen in the reactor is replenished as it is consumed in the reaction, resulting in a total consumption of 0.39 standard cubic meter of oxygen.

After one hour the oxidation is complete, and by further treating the contents of the reactor in the same way as indicated in Example I, 4.8 kg. of ammonium sulfate in form of crystals are obtained, while at the same time a saturated (at 20° C.) ammonium sulfate solution is formed which is separated from the organic base by decantation, or which may be re-used together with the organic base for the absorption and oxidation of additional sulfur dioxide.

EXAMPLE III

To an aqueous solution of 100 kg. containing 41.7% of ammonium sulfate, are added 50 kg. of 2-6-lutidine, the mixture is heated to 80° C. and intensely stirred in an oxygen atmosphere and at an absolute pressure of 3 atmospheres. The solution will be completely oxidized with an oxygen consumption of 4.03 standard cubic meters. The 2-6-lutidine phase is decanted and an aqueous solution containing 47.4% of ammonium sulfate is obtained, which is subjected to crystallization by cooling, while the saturated solution of ammonium sulfate formed thereby and the organic base can be re-used in the same way as indicated in Example I.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of oxidizing ammonium sulfite to ammonium sulfate, the step of contacting with an oxygen-containing gas an aqueous ammonium sulfite-containing solution having dispersed therethrough, as the only substance promoting the reaction between said oxygen-containing gas and said ammonium sulfite, an organic, nitrogen-containing base so as to oxidize said ammonium sulfite of said solution to ammonium sulfate thereby forming an aqueous ammonium sulfate-containing solution which is substantially free of ammonium sulfite.

2. In a method of oxidizing ammonium sulfite to ammonium sulfate, the step of contacting with an oxygen-containing gas an aqueous ammonium sulfite-containing solution having dispersed therethrough, as the only substance promoting the reaction between said oxygen-containing gas and said ammonium sulfite, a liquid, organic, nitrogen-containing base which is weaker than ammonia so as to substantially completely oxidize said ammonium sulfite of said solution to ammonium sulfate thereby forming an aqueous ammonium sulfate-containing solution which is substantially free of ammonium sulfite.

3. In a method of oxidizing ammonium sulfite to ammonium sulfate, the steps of contacting with an oxygen-containing gas an aqueous ammonium sulfite-containing solution having dispersed therethrough, as the only substance promoting the reaction between said oxygen-containing gas and said ammonium sulfite, a liquid, organic, nitrogen-containing base which is weaker than ammonia so as to substantially completely oxidize said ammonium sulfite of said solution to ammonium sulfate thereby forming an aqueous ammonium sulfate-containing solution which is substantially free of ammonium sulfite; and separating said organic base from said ammonium sulfite-containing solution.

4. In a method of oxidizing ammonium sulfite to ammonium sulfate, the steps of contacting with an oxygen-containing gas an aqueous ammonium sulfite-containing solution having dispersed therethrough, as the only substance promoting the reaction between said oxygen containing gas and said ammonium sulfite, a liquid, organic, nitrogen-containing base which is weaker than ammonia so as to substantially completely oxidize said ammonium sulfite of said solution to ammonium sulfate thereby forming an aqueous ammonium sulfate-containing solution which is substantially free of ammonium sulfite; separating said organic base from said ammonium sulfate-containing solution; and recovering ammonium sulfate therefrom.

5. A method for the substantially quantitative oxidation of ammonium sulfite into ammonium sulfate, comprising the steps of forming an aqueous solution of ammonium sulfite; and contacting said solution in the presence of an organic, nitrogen-containing base which is weaker than ammonia and insoluble in said solution, with an oxygen-containing gas, said nitrogen-containing base being the only substance present which is capable of promoting reaction between said ammonium sulfite of said solution and the oxygen of said gas.

6. A method of oxidizing sulfur dioxide, comprising the steps of absorbing sulfur dioxide in an aqueous ammonia-containing solution so as to form an aqueous ammonium sulfite-containing solution; and contacting the thus-formed solution in the presence of a finely dispersed organic, nitrogen-containing base which is weaker than ammonia and insoluble in said solution, with an oxygen-containing gas, said nitrogen-containing base being the only substance present which is capable of promoting reaction between said ammonium sulfite of said solution and the oxygen of said gas.

7. A method for the substantially quantitative oxidation of ammonium sulfite into ammonium sulfate, comprising the steps of forming an aqueous solution of ammonium sulfite; and contacting said solution at a temperature of between 40 and 140° C. in the presence of an organic, nitrogen-containing base which is weaker than ammonia and insoluble in said solution, with an oxygen-containing gas, said nitrogen-containing base being the only substance present which is capable of promoting reaction between said ammonium sulfite of said solution and the oxygen of said gas.

8. A method for the substantially quantitative oxidation of ammonium sulfite into ammonium sulfate, comprising the steps of forming an aqueous solution of ammonium sulfite; and contacting said solution at a temperature of between 40 and 140° C. and at an absolute pressure of between 1 and 11 atmospheres in the presence of an organic, nitrogen-containing base which is weaker than ammonia and insoluble in said solution, with an oxygen-containing gas, said nitrogen-containing base being the only substance present which is capable of promoting reaction between said ammonium sulfite of said solution and the oxygen of said gas.

9. A method for the substantially quantitative oxidation of ammonium sulfite into ammonium sulfate, comprising the steps of forming an aqueous solution of ammonium sulfite; and contacting said solution at a temperature of between 70 and 90° C. and at an absolute pressure of between 1 and 11 atmospheres in the presence of an organic, nitrogen-containing base which is weaker than ammonia and insoluble in said solution, with an oxygen-containing gas, said nitrogen-containing base being the only substance present which is capable of promoting reaction between said ammonium sulfite of said solution and the oxygen of said gas.

10. In a method of oxidizing ammonium sulfite to ammonium sulfate, the step of contacting with an oxygen-containing gas a substantially saturated aqueous ammonium sulfate and ammonium sulfite-containing solution having dispersed therethrough a liquid, organic, nitrogen-containing base which is weaker than ammonia so as to substantially completely oxidize said ammonium sulfite of said solution to ammonium sulfate thereby forming an aqueous ammonium sulfate-containing solution which is substantially free of ammonium sulfite, said nitrogen-containing base being the only substance present which is capable of promoting reaction between said ammonium sulfite of said solution and the oxygen of said gas.

11. A method of converting ammonium sulfite into ammonium sulfate, comprising the steps of forming a dispersion of an organic, nitrogen-containing base in an aqueous ammonium sulfite-containing solution, said organic base being insoluble in said aqueous solution and being present in an amount equal to between 10 and 80% of the volume of said dispersion, said nitrogen-containing base being the only substance present which is capable of promoting reaction between said ammonium sulfite of said solution and the oxygen of said gas; passing oxygen-containing gas through said dispersion so as to substantially completely oxidize said ammonium sulfite of said solution to ammonium sulfate; separating said base from the thus-formed substantial ammonium sulfite-free solution; and recovering ammonium sulfate from said solution.

12. A method of converting ammonium sulfite into ammonium sulfate, comprising the steps of forming a dispersion of an organic, nitrogen-containing base in an aqueous ammonium sulfite-containing solution, said organic base being insoluble in said aqueous solution and being present in an amount equal to between 10 and 80% of the volume of said dispersion, said nitrogen-containing base being the only substance present which is capable of promoting reaction between said ammonium sulfite of said solution and the oxygen of said gas; passing oxygen-containing gas through said dispersion while the same is maintained at an elevated temperature of between 40 and 140° C. and at an absolute pressure of between 1 and 11 atmospheres so as to substantially completely oxidize said ammonium sulfite of said solution to ammonium sulfate; separating said base from the thus-formed substantial ammonium sulfite-free solution; and recovering ammonium sulfate from said solution.

13. A method of converting ammonium sulfite into ammonium sulfate, comprising the steps of forming a dispersion of an organic, nitrogen-containing base in an aqueous solution of ammonium sulfate and ammonium sulfite, said organic base being insoluble in said aqueous solution and being present in an amount equal to between 10 and 80% of the volume of said dispersion, said nitrogen-containing base being the only substance present which is capable of promoting reaction between said ammonium sulfite of said solution and the oxygen of said gas; passing oxygen-containing gas through said dispersion so as to substantially completely oxidize said ammonium sulfite of said solution to ammonium sulfate; separating said base from the thus-formed substantial ammonium sulfite-free solution; and recovering ammonium sulfate from said solution.

14. In a method of oxidizing ammonium sulfite to ammonium sulfate, the steps of contacting with an oxygen-containing gas an aqueous ammonium sulfite-containing solution having dispersed therethrough a liquid, organic, nitrogen-containing base which is weaker than ammonia and which is selected from the group consisting of pyridine, picolines, lutidines, collidines, quinoline, pyridic, coal-tar bases, pyridic bases derived from petro-chemical processes, bases containing pyridinic condensed rings and derivatives thereof, so as to substantially completely oxidize said ammonium sulfite of said solution to ammonium sulfate thereby forming an aqueous ammonium sulfate-containing solution which is substantially free of ammonium sulfite; and separating said organic base from said ammonium sulfate-containing solution.

15. A method of converting ammonium sulfite into ammonium sulfate, comprising the steps of forming a dispersion of an organic, nitrogen-containing base in an aqueous ammonium sulfite-containing solution, said organic base being insoluble in said aqueous solution and being present in an amount equal to between 10 and 80% of the volume of said dispersion, said nitrogen-containing base being the only substance present which is capable of promoting reaction between said ammonium sulfite of said solution and the oxygen of said gas; passing air through said dispersion so as to substantially completely oxidize said ammonium sulfite of said solution to ammonium sulfate; separating said base from the thus-formed substantial ammonium sulfite-free solution; and recovering ammonium sulfate from said solution.

References Cited
UNITED STATES PATENTS

| | | | |
|---|---|---|---|
| 1,106,919 | 8/1914 | Bosch | 23—119 |
| 2,970,039 | 1/1961 | Vian-Ortuno et al. | 23—119 |

OSCAR R. VERTIZ, *Primary Examiner.*

EARL C. THOMAS, *Examiner.*